United States Patent [19]

Wassel et al.

[11] Patent Number: 4,630,192

[45] Date of Patent: Dec. 16, 1986

[54] APPARATUS FOR EXECUTING AN INSTRUCTION AND FOR SIMULTANEOUSLY GENERATING AND STORING RELATED INFORMATION

[75] Inventors: Edward R. Wassel, Endwell; Gerald J. Watkins, Endicott, both of N.Y.

[73] Assignee: International Business Machines Corporation, Armonk, N.Y.

[21] Appl. No.: 495,563

[22] Filed: May 18, 1983

[51] Int. Cl.⁴ .......................... G06F 12/04; G06F 7/38
[52] U.S. Cl. ...................................... 364/200; 364/715
[58] Field of Search ... 364/200 MS File, 900 MS File, 364/715.09

[56] References Cited

U.S. PATENT DOCUMENTS

| | | | |
|---|---|---|---|
| 3,815,095 | 6/1974 | Wester | 364/200 |
| 3,939,455 | 2/1976 | Toyosawa | 364/200 |
| 4,128,880 | 12/1978 | Cray, Jr. | 364/200 |
| 4,169,212 | 9/1979 | Kinch, Jr. et al. | 178/22 |
| 4,287,566 | 9/1981 | Culler | 364/200 X |
| 4,371,951 | 2/1983 | Kort et al. | 364/900 |
| 4,486,848 | 12/1984 | Kaminski | 364/715 |

OTHER PUBLICATIONS

Duff, "Computing Structures for Image Processing", 1983 Academic Press, pp. 187 to 188 and 193 to 194.

*Primary Examiner*—James D. Thomas
*Assistant Examiner*—C. H. Lynt
*Attorney, Agent, or Firm*—John H. Bouchard

[57] ABSTRACT

In a computer system, an instruction is executed. The results of the execution of the instruction are stored, and, simultaneously with the execution of the instruction, information is generated and stored which is related to the results of the execution of the instruction. This information is used by the computer system during the execution of subsequent instructions. The results of the execution of the instruction comprise a binary number. The information which is generated, simultaneously with the execution of the instruction, includes, inter-alia, a count of the number of binary "1" bits and binary "0" bits which constitute the binary number, and a set of addresses representing the address locations of each bit of the binary number which constitutes the stored results of the execution of the instruction. The set of addresses include a first set of addresses representing address locations for all the binary "1" bits and a second set of addresses representing address locations for all the binary "0" bits of the binary number. The first set of addresses are stored in a first portion of a memory, the second set of addresses being stored in a second portion of the memory. As a result, the information is immediately available upon completion of the execution of the instruction.

4 Claims, 3 Drawing Figures

APPARATUS FOR EXECUTING AN INSTRUCTION AND FOR SIMULTANEOUSLY GENERATING AND STORING RELATED INFORMATION

BACKGROUND OF THE INVENTION

1. Field of the Invention

The subject matter of the present invention pertains to a computer system, and, more particularly, to an apparatus within the computer system which, during an execution of an instruction, stores information which is to be used by subsequent instructions which is related to the results of the execution of the instruction, whereby access to the information is immediately available to the subsequent instructions upon completion of the execution of the instruction.

2. Description of the Prior Art

In a prior art computer system, such as U.S. Pat. No. 4,128,880 to Cray Jr., or U.S. Pat. No. 4,287,566 to Culler, when an instruction is executed, the results of the execution are sometimes stored in a register. Oftentimes, a processor will request certain information related to these results. However, the information must first be generated from the results of the execution of the instruction prior to being passed to the processor. Consequently, time is consumed while generating the information.

For example, assume that the instruction being executed is a COMPARE instruction and that the respective elements of two element strings, referred to as vectors, are being compared to determine whether the magnitude of the first vector element is greater than the magnitude of the respective element of the second vector. An element may be defined as a 32 bit signed binary number, or a floating point short number or a floating point long number. Assume that a third vector, representing the results of the comparison, is stored in the register in the form of a bit string of binary 1s and 0s. The following information is related to the third vector, the results of the comparison, and may be required by the processor during a subsequent instruction execution:

(1) a count of the number of 1s or 0s comprising the bit string representing the third vector stored in the register;

(2) a count of the number of continuous left zeros of the bit string stored in the register;

(3) the addresses of the 1s and 0s comprising the bit string stored in the register.

The processor may complement the third vector and still provide the information recited above. Similarly, the processor may retrieve a bit vector from storage and may perform the logical functions of AND, OR, and EXCLUSIVE OR on the bit vector and the third vector. The processor may retrieve a bit vector from storage and utilize the bit vector as the third vector. The processor may read the third vector and place said vector in storage.

However, in the computer system of the prior art, if, following the execution of the COMPARE instruction, the processor requested one or more of the above items of information, it was necessary to generate this information prior to passing it to the processor.

SUMMARY OF THE INVENTION

It is a primary object of the present invention to provide a computer system containing an apparatus for executing an instruction, for storing the results of the execution, and for generating and storing certain special information related to the results of the execution, the special information being generated and stored concurrently with the execution of the instruction, whereby the information is immediately available following the execution of the instruction.

It is another object of the present invention to provide said computer system containing said apparatus for executing an instruction, for storing the results of the execution, and for generating and storing certain special information related to the results of the execution concurrently with the execution, wherein the results of the execution may comprise a digital, binary number, and the special information includes a count of the number of 1s and 0s which constitute the results of the execution.

It is still another object of the present invention to provide said computer system containing said apparatus wherein the results of the execution may comprise a digital, binary number and the special information includes the location of each of the 1s and 0s in storage which constitute the results of the execution.

These and other objects of the present invention are accomplished by providing a computer system including: a means for executing an instruction, for generating results of the execution, and for storing said results; and a means for monitoring the generation and storage of the results of the execution during the execution of the instruction and for generating and storing certain special information which is related to the results of the execution. The results of the execution may comprise a digital, binary number. Therefore, if the results comprise the digital, binary number, the special information would include, inter-alia, a count of the number of 1s and 0s which constitute the stored results of the execution and the addresses of the 1s and 0s in storage which constitute the results of the execution.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

A full understanding of the present invention will be obtained from the detailed description presented below and the accompanying drawings, which are given by way of illustration only, and thus are not limitative of the present invention, and wherein.

DESCRIPTION OF THE PREFERRED EMBODIMENT

Figure 1:
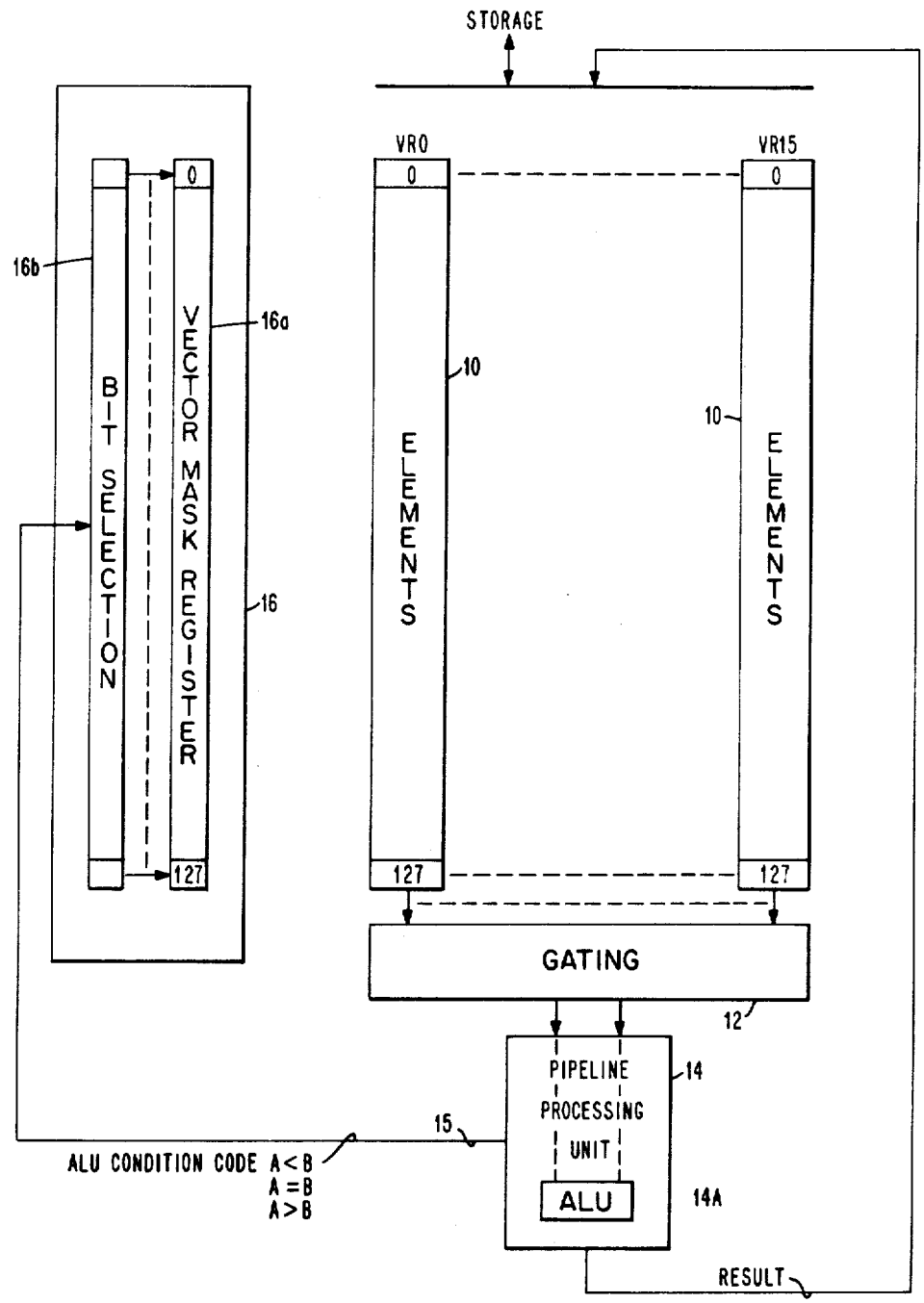
FIG. 1 illustrates a basic block diagram of a portion of a computer system including a means for executing an instruction and an apparatus including a means for storing the results of the execution of the instruction, and a means for generating and storing special information, related to the results of the execution of the instruction, concurrently with the execution of the instruction.

Referring to FIG. 1 a basic block diagram of a portion of a computer system is illustrated. In FIG. 1, a plurality of vector registers (VR0–VR15) 10 are illustrated. Each vector register contains a vector, that is, a string of elements of data, each element comprising a plurality of bits. A gating circuit 12 is connected to each of the vector registers 10 for gating corresponding elements from one or more of the vector registers 10 into a pipeline processing unit 14, which is connected to the gating circuit 12. The processing unit 14 performs certain processing operations, such as arithmetic operations, on the elements received from the vector registers 10, via the gating circuit 12. For example, the processing unit 14 may perform a compare operation on said elements wherein the magnitude of an element from one vector register is compared with the magnitude of a corresponding element from another vector register. The processing unit 14 is connected to an apparatus 16 which stores a set of results associated with the processing operation (the COMPARE operation) performed on the corresponding elements disposed within the vector registers 10. The apparatus 16 includes a Vector Mask Register (VMR) 16a which stores the results of the processing operation and a bit selector 16b connected to the VMR 16a and to the processing unit 14 for addressing or selecting a location in the VMR 16a for storage of a result of the processing operation.

In operation, referring to FIG. 1, assume that a compare operation is being performed on the vectors stored in a first vector register VR0 and a second vector register VR15, wherein the magnitude of an element of one vector is compared with the magnitude of a corresponding element of the other vector. If the magnitude of the element of a first vector VR0 is greater than the magnitude of the corresponding element of a second vector VR15, a "true" condition is set forth. If the magnitude of the element of a first vector VR0 is less than or equal to the magnitude of a corresponding element of a second vector VR15, a "false" condition is set forth. A "true" condition represents a binary "1" and a "false" condition represents a binary "0". In FIG. 1, each of the corresponding elements of a pair of vectors stored in vector registers VR0 and VR15 are gated into the pipeline processing unit 14 via the gating circuit 12. Assuming a 127 element string in vector registers VR0 and VR15, the 127 elements from registers VR0 and VR15 are gated into the pipeline processing unit 14 via gating circuitry 12. The processing unit 14 performs a compare operation on these elements, wherein it is determined whether the magnitude of each element from register VR0 is greater than, less than, or equal to the magnitude of each element from register VR15. When the comparison is complete, an output signal is generated from the processing unit 14 representative of the determined condition for that pair of elements. The bit selector 16b determines the bit location in the VMR 16a which stores the results of the comparison of the magnitudes of the two elements, and a binary "1" or a binary "0" is stored within said bit location of the VMR 16a representative of the determined "true" or "false" condition. As a result, another, third vector is stored in the VMR 16a representative of the results of the compare operation.

In the above paragraphs, the processing unit performed a compare operation on the respective elements stored in two of the vector registers 10. In lieu of the compare operation, other processing operations could be performed on the elements of the vectors stored in the vector registers 10 producing a result of the processing operation, the result being stored in the VMR 16a.

When the results are stored in the VMR 16a, various other operations may be performed on the results yielding other results which are re-stored in the VMR. For example, since a vector is stored in the VMR representing said results, the processor may AND, OR, or EXCLUSIVE OR this vector with another vector, and re-store the results in the VMR. The processor may complement the vector yielding another vector stored in the VMR.

In addition, certain information may be derived from the results stored in the VMR. For example, said information may include a count of the number of binary "1" bits comprising said vector. Alternatively, said information may include a collection of addresses associated with the location of the binary "1" bits or the binary "0" bits of said vector stored in the VMR 16a.

In the prior art, it was necessary to generate this information after the results were stored in the VMR. As a result, a period of time elapsed before this information became available.

Figure 2:
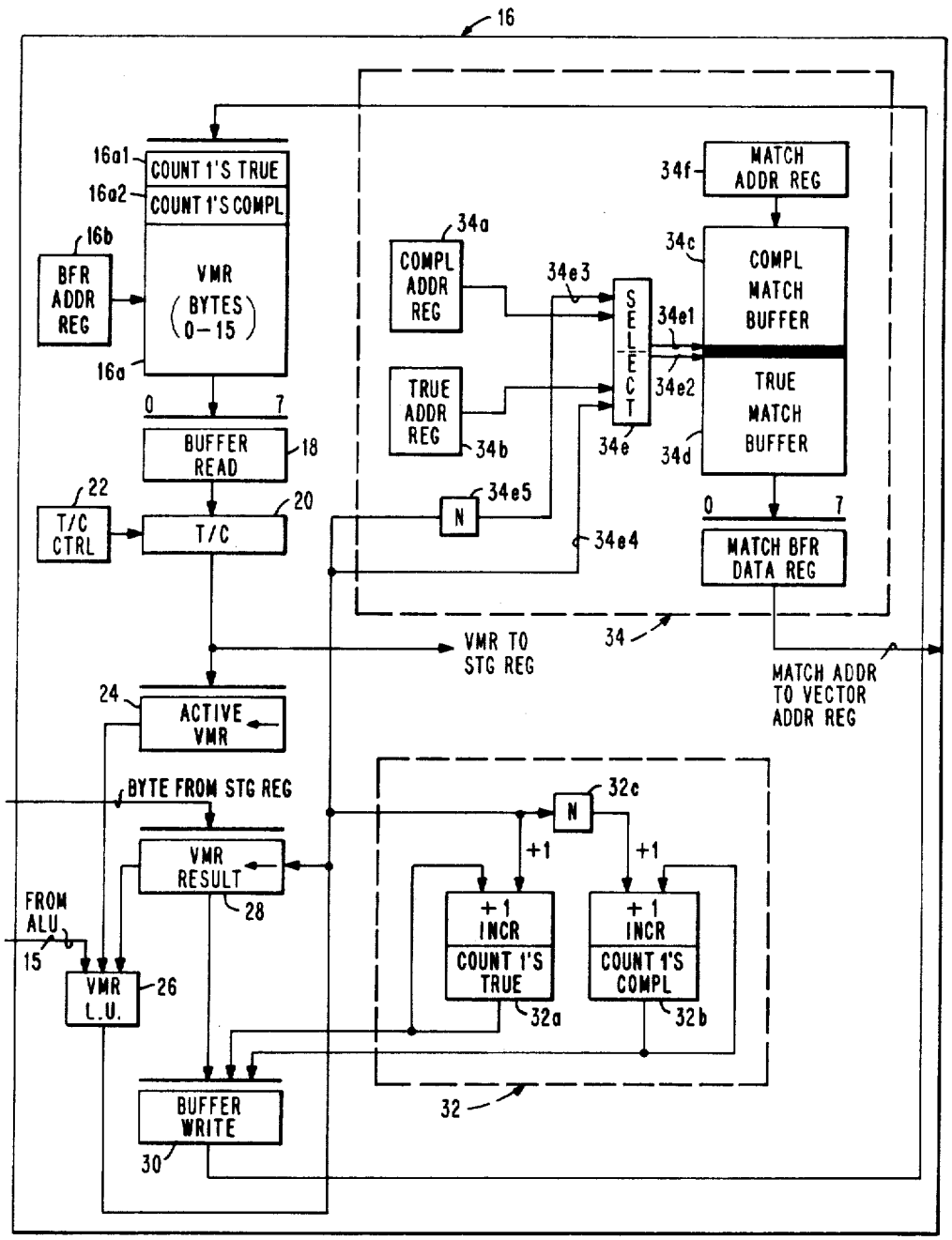
FIG. 2 illustrates a detailed construction of the apparatus of FIG. 1.

Referring to FIG. 2, the apparatus 16 shown in FIG. 1 is illustrated wherein information is generated simultaneously with the storage of the results of the execution of an instruction in the VMR. Consequently, this information is immediately available following the storage of the results in the VMR. It is not ncessary to wait said period of time before having access to this information. In FIG. 2, the generated information comprises a count of the number of binary "1" bits and a count of the number of binary "0" bits stored in the VMR. It further comprises a collection of addresses corresponding to the address locations of the binary "1" bits and the binary "0" bits stored in the VMR.

In FIG. 2, the apparatus 16 comprises a VMR storage 16a corrsponding to the VMR 16a of FIG. 1. The VMR storage 16a stores the results of the processing performed by the processor unit 14. A buffer address register 16b is connected to the VMR storage 16a. The buffer address register 16b corresponds to the bit selector 16b of FIG. 1 and functions as an addressing means for addressing the VMR storage 16a in synchronism with the selection of elements in the vector registers (VR0–VR15) 10. The VMR storage 16a includes a count 1s true buffer 16a1 and a count 1s complement buffer 16a2 for storing a count of the number of binary 1s and binary 0's, respectively, which constitute the result vector stored in the VMR storage 16a.

The apparatus 16 further comprises a special information generation and storage means for generating and storing special information related to the results of the execution of the instruction. The special information generation and storage means comprises the following components.

A buffer read register 18 is connected to the VMR storage 16a for reading one byte of the vector stored in the VMR storage 16a, which contains, in this example, 16 bytes. A trues/complement gate 20 is connected to the buffer read register 18 for gating the byte of data from the buffer read register 18 through the gate 20 in response to a control signal generated from a trues/complement control signal generator 22. An active VMR register 24 is connected to the gate 20 for receiving the byte of data from the gate 20 and temporarily storing the byte of data. A VMR logic unit 26 is connected to the active VMR register 24 and to the pipeline processing unit 14 of FIG. 1 for changing the byte of data, a bit at a time, received from the active VMR register 24 in accordance with the results of the processing operation performed on a pair of elements of the vectors, disposed within vector registers 10, by the processing unit 14 of FIG. 1. A VMR result register 28 is connected to an output of the VMR logic unit 26 for receiving the changed bit of data from the VMR logic unit 26, one bit at a time, and storing the changed bit of data. The VMR result register operates as a shift register for left-shifting the incoming bits until a byte is assembled. An output of the VMR result register 28 is also connected to the VMR logic unit 26 for changing the changed bit of data, once again, in accordance with the results of a processing operation performed by the processing unit 14 on the elements of the vectors stored in the vector registers 10 of FIG. 1. A buffer write register 30 is connected to a further output of the VMR result register 28 and to the VMR storage 16a for receiving a changed byte from the VMR result register 28 and writing the changed byte into the VMR storage 16a, the changed byte being written into the location of the VMR storage 16a in which it resided prior to its withdrawal by the buffer read register 18. As previously mentioned, the output from the VMR logic unit 26 is connected to the VMR result register 28. However, the output of the logic unit 26 is also connected to a counting apparatus 32 for counting the number of logical 1s and 0s constituting the changed byte of data received from the logic unit 26 to be stored in the VMR storage 16a. The output of the logic unit 26 is further connected to an address storage apparatus 34 for storing the addresses of each of the logical 1s and logical 0s, which constitute the changed byte of data, to be stored in the VMR storage 16a.

The counting apparatus 32 comprises a count 1s true counter 32a connected to the logic unit 26 for counting the number of logical 1s which constitute the changed bit of data received from the logic unit 26 and a count 1s complement counter 32b connected to the logic unit 26 via an inverter 32c for counting the number of logical 0s which constitute the changed bit of data received from the logic unit 26. Each of the counters 32a and 32b include a storage register for storing the counts, and an incrementer connected to the storage register for incrementing the count stored in the storage register by a value of "1".

Figure 3:
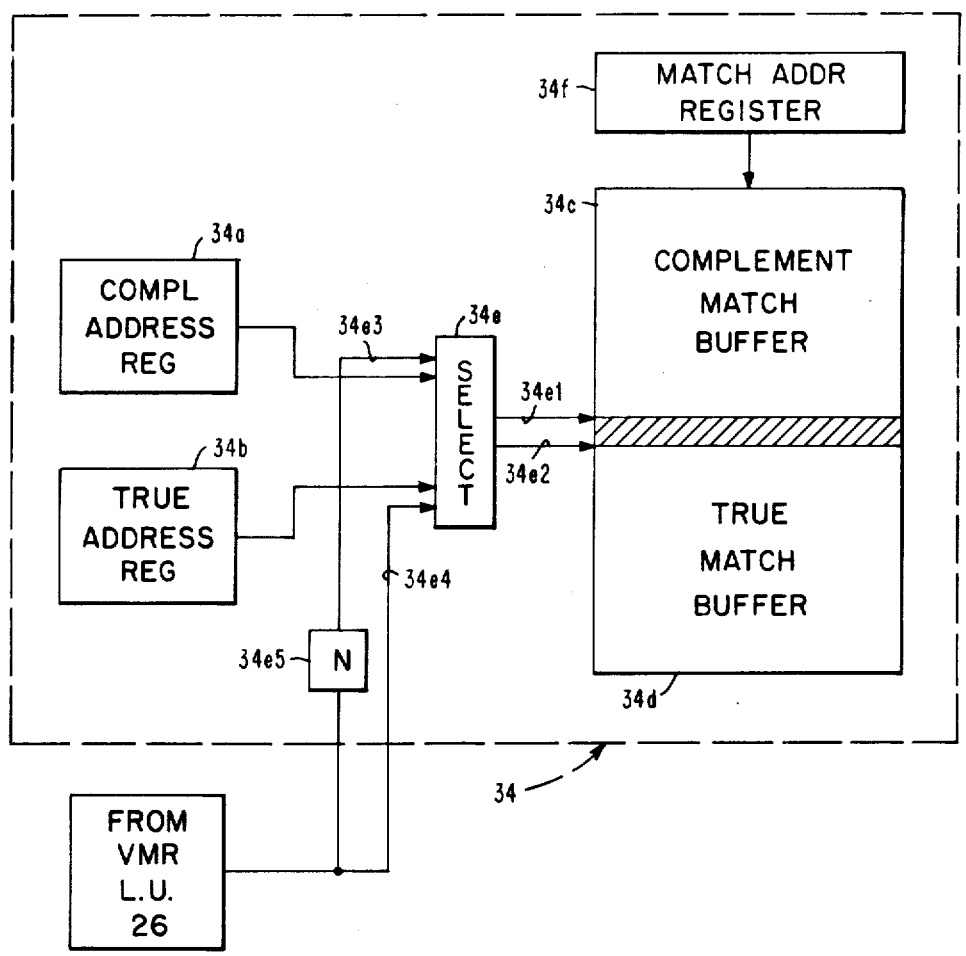
FIG. 3 illustrates a detailed construction of a portion of the apparatus of FIG. 2.

The address storage apparatus 34 comprises a complement match buffer 34c and a true match buffer 34d for storing information related to the location or address of the binary 0 and 1 bits, respectively, stored in the VMR storage 16a. The apparatus 34 further includes a complement address register 34a and a true address register 34b for addressing locations within the complement match buffer 34c and the true match buffer 34d for storage of said information. A match address register 34f is connected to the complement and true match buffers 34c and 34d, respectively, for initially storing said information and for supplying said information to the complement match buffer 34c and to the true match buffer 34d in response to the addressing performed by the complement and true address registers 34a and 34b, respectively. The match address register 34f supplies said information in synchronism with the reading of elements from the vector registers 10 and with the storage of binary 0 and 1 bits in the VMR storage 16a. A select gate 34e interconnects, respectively, the address registers 34a and 34b to the match buffers 34c and 34d in accordance with an output signal from the VMR logic unit 26. As shown in FIG. 3, the select gate 34e includes two output pointers 34e1 and 34e2. One pointer 34e1 enables the addressing of the complement match buffer 34c by the complement address register 34a in response to the output signal from the VMR logic unit 26, the other pointer 34e2 enabling the addressing of the true match buffer 34d by the true address register 34b, in response to the output signal from the VMR logic unit 26. The select gate 34e further includes two selection inputs 34e3 and 34e4, one selection input 34e3 connecting the complement address register 34a to the complement match buffer 34c via one pointer 34e1 in response to the output signal from the VMR logic unit 26 representing a logical "0", the other selection input 34e4 connecting the true address register 34b to the true match buffer 34d via the other pointer 34e2 in response to the output signal from the VMR logic unit 26 representing a logical "1". An inverter 34e5 is associated with the one selection input 34e3 for changing a logical "0" output from the logic unit 26 to a logical "1" thereby permitting the selection input 34e3 to connect the complement address register 34a to the complement match buffer 34c via pointer 34e1. According to one feature of the present invention, pointers 34e1 and 34e2 are initially placed in a position approximately congruent with respect to one another, the pointers moving in opposite directions with respect to one another, enabling the addressing of locations within match buffers 34c and 34d, as the elements constituting the vectors stored in vector registers 10 are processed, and as the bits constituting the changed bytes, output from the VMR result register 28, are stored within corresponding locations of the VMR storage 16a. According to another feature of the present invention, pointers 34e1 and 34e2 are initially placed in a position at opposite limits with respect to one another, the pointers moving in a direction toward one another, enabling the addressing of locations within match buffers 34c and 34d as described above.

A full description of the functional operation of the present invention will now be described with reference to FIGS. 1 through 3 of the drawings.

A vector, disposed within vector register VR0, of registers 10, undergoes a processing operation, element by element, with respect to a vector disposed within vector register VR15. Assuming a compare processing operation is performed, the 0th element of one vector is compared with the 0th element of the other vector. If the magnitude of one element of one vector is greater than the magnitude of the other element of the other vector, the pipeline processing unit 14 develops an output signal representative of the binary "1" bit. If the magnitude of the one element is less than or equal to the magnitude of the other element, the processing unit develops an output signal representative of the binary "0" bit. The 1st element of the vectors stored in registers VR0 and VR15 are compared in the same manner as described above, and output signals are generated from the processing unit 14 indicative of either a binary "1" bit or a binary "0" bit. The 2nd element through the 127th element of the vectors stored in vector registers VR0 and VR15 are also processed in the same manner. As a result, a stream of 1s and 0s are propagated along path 15, shown in FIGS. 1 and 2, representative of the results of the compare operation performed by the processing unit 14. This stream of 1s and 0s is introduced as an input signal to the VMR logic unit 26 of FIG. 2.

Simultaneously with the processing of the 0th through the 127th elements of the vectors stored in vector register VR0 and VR15, a buffer address register is addressing locations within the VMR storage 16a of FIG. 2. That is, as the first eight elements of the vectors are processed (0 through 7), one byte of data is read from the VMR storage 16a of FIG. 2. The one byte of data is transferred to the active VMR register 24 via the buffer read register 18 and gate 20 and is stored in register 24.

Initially, the VMR storage 16a contains a plurality of bytes of data. The VMR logic unit 26 receives the stream of 1s and 0s along path 15, from the processing unit 14. The bits constituting the one byte of data stored in the active VMR register 24 are left-shifted one bit at a time. Consequently, the VMR logic unit 26 receives a binary 1 or 0 bit along path 15 representing the COMPARE of the elements stored in vector registers VR0 and VR15 simultaneously with a binary 1 or 0 bit from the active VMR result register 24 representing one bit of the 0th element stored in register 24. The VMR logic unit 26 may, for example, develop an output signal representing a binary 1 when the bit along path 15 is a binary 1 and develop an output signal representing a binary 0 when the bit along path 15 is a binary 0.

Alternatively, the bit appearing on the output of the VMR result register 28 may undergo an AND, OR, or EXCLUSIVE OR operation with respect to the bit from the active VMR register 24, the VMR logic unit 26 performing the operation.

As a result, another byte of data, corresponding to the one byte of data stored in the active VMR register 24, is stored in the VMR result register 28 representative of the results of the compare operation performed on the first eight elements (0 through 7) of the vectors stored in the vector registers VR0 and VR15. The VMR logic unit 26 may perform the same operation, as described above, with respect to the bits stored in the VMR result register 28, in lieu of the active VMR register 24.

As each bit is stored in the VMR result register 28, representative of said another byte of data, the counting apparatus 32 and the address storage apparatus 34 receives said each bit. The functional operation of the counting apparatus 32 and the address storage apparatus 34, responsive to the receipt of said each bit, is described in the following paragraphs.

When a bit is stored in the VMR result register 28, if the bit is a binary "1", counter 32a increments the count stored therein by a value of one. If the bit is a binary "0", inverter 32c converts the binary "0" value to a binary "1". As a result, counter 32b increments the count stored therein by a value of one. Consequently, counter 32a records the number of binary 1s present in the data stored in the VMR result register 28, whereas counter 32b records the number of binary 0s present in said data.

If a bit stored in the VMR result register 28 is a binary 1, selection input 34e4 enables a portion of the select gate 34e. Enablement of this portion of the select gate 34e allows the true address register 34b to address a location within the true match buffer 34d. When this location of the true match buffer 34d is addressed, address information (corresponding to the location address of the elements of the vector registers being processed and to the location address of the resultant bit stored in the VMR storage 16a) is transferred from the match address register 34f to the true match buffer 34d for storage within the buffer 34d.

If the bit stored in the VMR result register 28 is a binary 0, inverter 34e5 converts the binary 0 to a binary 1, and selection input 34e3 enables the other portion of the select gate 34e. Enablement of this other portion of the select gate 34e allows the complement address register 34a to address a location within the complement match buffer 34c. When this location of the complement match buffer 34c is addressed, said address information is transferred from the match address register 34f to the complement match buffer 34c for storage within the buffer 34c. As shown in FIG. 3, according to the one feature of the present invention, pointers 34e1 and 34e2 move in opposite directions with respect to one another, addressing locations within the complement and true match buffers, 34c and 34d, respectively, enabling the transfer of address information from the match address register 34f to buffers 34c and 34d.

As the elements are sequentially read from the vector registers VR0 and VR15, address information, representative of the addresses of the elements in the VMR 16a, is synchronously and sequentially read from the match address register 34f. However, the selection inputs 34e3 and 34e4, corresponding to a binary 0 and a binary 1, respectively, determine whether the complement address register 34a or the true address registers 34b addresses locations within the complement match buffer 34c or the true match buffer 34d, respectively.

When counters 32a and 32b record the count of the binary 1s and 0s stored in the VMR 16a, the buffer write register 30 reads the counts from the counters 32a and 32b and stores the counts in the count 1s true buffer 16a1 and in the count 1s complement buffer 16a2, respectively.

As shown in FIG. 3, according to one feature of the present invention, pointers 34e1 and 34e2 move in opposite directions. However, if vector registers 10 comprise 127 elements, this feature requires a complement match buffer 34c having, at least, 127 address locations, and a true match buffer 34d having, at least, 127 address locations. According to another feature of the present invention, pointers 34e1 and 34e2 are initially located at opposite limits with respect to one another, and move toward each other as the elements of the vector registers 10 are processed. As a result, this additional feature of the present invention requires a complement match buffer 34c having less than 127 address locations, and a true match buffer 34d having less than 127 address locations. Therefore, the embodiment of invention utilizing this additional feature of the present invention is less costly than the embodiment of invention utilizing the former feature.

Assume that the processing unit 14 receives an instruction to "COMPLEMENT THE VMR REGISTER". In response to this instruction, when a byte of data is read from the VMR register 16a, the true/complement control gate 22 changes the uncomplemented binary "1" bits and the uncomplemented binary "0" bits of the byte of data to complemented binary "0" bits and complemented binary "1" bits, respectively. The complemented byte of data, comprising the complemented bits, is stored for future use. If the address of a complemented binary "1" bit, corresponding to the uncomplemented binary "0" bit of the byte of data stored in the VMR 16a, is required, the true/complement control gate 22 causes a corresponding address stored in the complement match buffer 34c (not the true match buffer 34d) to be selected. The corresponding address stored in the complement match buffer 34c is selected because the complemented binary "1" bit previously existed as an uncomplemented binary "0" bit, in the VMR16a, prior to execution of the COMPLEMENT THE VMR REGISTER instruction. Similarly, if the address of a complemented binary "0" bit is required, a corresponding address stored in the true match buffer 34d (not the complement match buffer 34c) is selected.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

We claim:

1. A computer system, comprising:
   execution means for executing instructions and generating a set of results in response to the execution of said instructions, said set of results including binary digits;
   first storing means responding to said set of results for storing said set of results therein; and
   counting means responding to said set of results for maintaining a count, during the generation of said set of results by said execution means, of the number of identical ones of said binary digits the identical binary digits comprising binary one digits and binary zero digits, which comprise said set of results;
   second storing means responding to said set of results for storing a first set of addresses therein, during the generation of said set of results by said execution means, which are the locations within said first storing means wherein said binary one digits are stored; and third storing means responding to said set of results for storing a second set of addresses therein, during the generation of said set of results by said execution means, which are the locations within said first storing means wherein said binary zero digits are stored.

2. The computer system of claim 1, wherein said counting means storing the first and second counts of the number of binary one digits and the number of binary zero digits in separate sections of said first storing means.

3. A method of analyzing a set of results developed by an execution means during the execution of an instruction, said set of results including binary digits and further including binary one digits and binary zero digits, said binary one digits and said binary zero digits of said set of results being stored in a set of locations within a storage means following development thereof, comprising the steps of:
   receiving the binary digits of said set of results; and
   during the development of said set of results by said execution means, counting the number of said binary one digits of said binary digits of said set of results, and counting the number of said binary zero digits of said binary digits of said set of results;
   during the development of said set of results of said execution means, storing a first set of addresses in a first further storage means which are the locations within said storage means wherein said binary one digits are stored; and during the development of said set of results by said execution means, storing a second set of addresses in a second further storage means which are the locations within said storage means wherein said binary zero digits are stored.

4. The method of claim 3, further comprising the step of: following the counting, further storing said count of the number of said binary one digits and said count of the number of binary zero digits in said storage means.

* * * * *